U S009117221B2

United States Patent
Goodwin et al.

(10) Patent No.: US 9,117,221 B2
(45) Date of Patent: Aug. 25, 2015

(54) SYSTEM AND METHOD FOR THE TRANSMISSION OF LIVE UPDATES OF EMBEDDABLE UNITS

(75) Inventors: Giles Goodwin, San Francisco, CA (US); Christopher Coco, San Francisco, CA (US); Nelson Carpentier, San Francisco, CA (US)

(73) Assignee: Flite, Inc., San Francisco, CA (US)

( * ) Notice: Subject to any disclaimer, the term of this patent is extended or adjusted under 35 U.S.C. 154(b) by 374 days.

(21) Appl. No.: 13/533,021

(22) Filed: Jun. 26, 2012

(65) Prior Publication Data

US 2013/0007108 A1  Jan. 3, 2013

Related U.S. Application Data

(60) Provisional application No. 61/571,645, filed on Jun. 30, 2011.

(51) Int. Cl.
*G06F 15/16* (2006.01)
*G06Q 30/02* (2012.01)
*H04L 29/08* (2006.01)
*G06F 17/30* (2006.01)

(52) U.S. Cl.
CPC .......... *G06Q 30/02* (2013.01); *G06F 17/30887* (2013.01); *H04L 67/2814* (2013.01); *H04L 67/2852* (2013.01)

(58) Field of Classification Search
CPC .. H04L 67/26; G06F 17/30905; G06Q 30/02; G06Q 30/0277; G06Q 30/0241
USPC ........................................................ 709/203
See application file for complete search history.

(56) References Cited

U.S. PATENT DOCUMENTS

| 7,395,355 B2 * | 7/2008 | Afergan et al. ............... 709/247 |
| 7,596,759 B2 * | 9/2009 | Verna ............................. 715/772 |
| 8,045,713 B2 * | 10/2011 | Lain et al. ..................... 380/277 |
| 8,341,278 B2 * | 12/2012 | Tewari et al. ................. 709/229 |
| 8,521,857 B2 * | 8/2013 | Maxwell et al. .............. 709/223 |
| 8,589,992 B2 * | 11/2013 | Babic ............................. 725/87 |
| 8,595,186 B1 * | 11/2013 | Mandyam et al. ............ 707/632 |
| 2008/0040681 A1 * | 2/2008 | Synstelien et al. ............ 715/765 |
| 2008/0104496 A1 * | 5/2008 | Williams et al. .............. 715/209 |
| 2012/0259946 A1 * | 10/2012 | Stockhammer et al. ...... 709/217 |
| 2013/0080579 A1 * | 3/2013 | Gordon et al. ................ 709/217 |
| 2013/0103782 A1 * | 4/2013 | Afergan et al. ............... 709/213 |

* cited by examiner

*Primary Examiner* — Kevin Bates
*Assistant Examiner* — Clarence D McCray
(74) *Attorney, Agent, or Firm* — Lumen Patent Firm

(57) ABSTRACT

A delivery method and system of dynamic embedded web output on a web page in a browser on a client device is provided. A web page contains an embed code for an embeddable unit. A content delivery network provides an embedded URL specified in the embed code. The URL contains executable static runtime code using a unit ID. The unit ID is passed to a dynamic server which performs a lookup to convert the unit ID into a cache key URL. The cache key URL points to a location on the content delivery network and encodes a cache key containing information for the embeddable unit. The client device loads the cache key URL, which targets the content delivery network to make a request for the embeddable unit. The content delivery network serves the embeddable unit to the client device on which the embeddable unit is displayed or updated.

2 Claims, 2 Drawing Sheets

SYSTEM AND METHOD FOR THE TRANSMISSION OF LIVE UPDATES OF EMBEDDABLE UNITS

CROSS-REFERENCE TO RELATED APPLICATIONS

This application claims priority from U.S. Provisional Patent Application 61/571,645 filed Jun. 30, 2011, which is incorporated herein by reference.

FIELD OF THE INVENTION

This invention relates to methods and systems for the delivery of dynamic web output.

BACKGROUND OF THE INVENTION

Common nowadays in Web browsing and interaction is the use of embeddable units such as display advertisements and widgets. Preferably one would like to perform live updates for an embeddable unit to make information display and advertising more dynamic and relevant. Three requirements in solutions are key to the success of these live updates.
1. High scale: Such a solution would be equally effective regardless of whether the embeddable unit exists on only a few web pages, or on thousands of pages.
2. Low cost: Such a solution would have low server processing and bandwidth requirements as compared to other live update solutions, making it cheaper to implement.
3. Fast and reliable change propagation: Such a solution would result in changes propagating to all embed sites and clients as soon as the embeddable unit is updated on the provider's side.

An advertisement or widget may appear on many web pages, so the ability to update these units without having to replace the embed tags each time, and in a manner that is fast, reliable, scalable, and cost-efficient, is very valuable to customers, including advertisers, publishers, and widget creators. The present invention addresses these requirements for live updates and advances the art by providing techniques to accomplishes all three goals at once: scalability, low cost, and fast, reliable changes.

SUMMARY OF THE INVENTION

The present invention referred to as Live Updates provides solutions for the delivery of dynamic web output at very high volume (scale) while providing rapid changes to the definition of that content (flexibility). This is accomplished using a combination of commodity servers serving dynamic content with global caches of static content (content delivery networks). The servers delivering dynamic content are used to direct client requests to static content via an HTTP redirect and with embedded information in the location of that content used to populate the cache with long lived content. The location information is a complex cache key comprised of identity and version data. The key is used both to locate content in the global cache and to populate that content with the latest data if the cache does not contain that key. Since the key includes many components any of those components may change independently and result in a cache miss and update the definition of the entire content. The number of components in the key are arbitrary and may be adapted as needed.

DETAILED DESCRIPTION

Definitions

Figure 1:
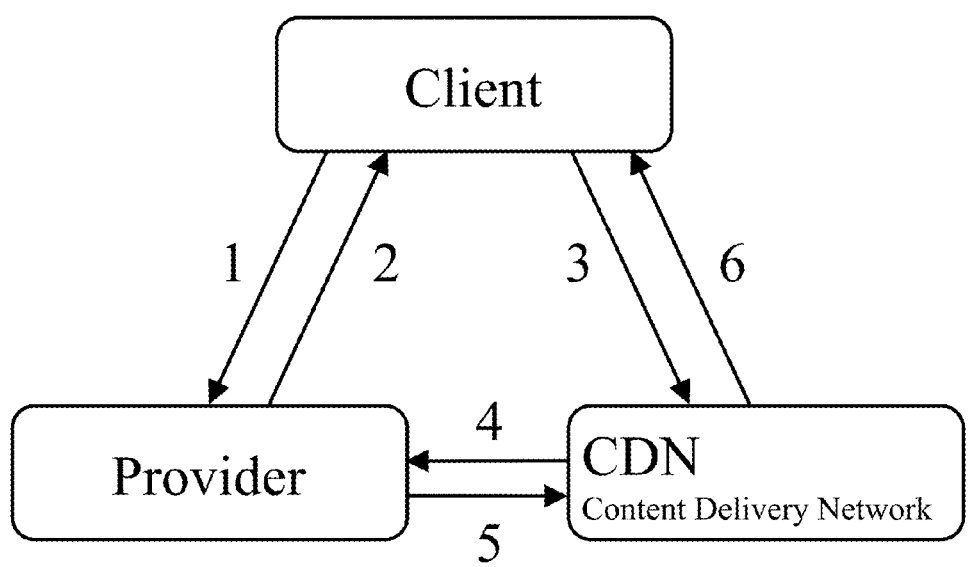
FIG. 1 shows an outline of a live update method and system according to an exemplary embodiment of the invention.

Embeddable unit: A self-contained unit that can be encased in an HTML embed tag (<script>, <iframe> or other) and placed on any website. Embeddable units are typically created using Flash or HTML/JS. An embeddable unit can contain any content that a web page can contain.

Live update: The ability to update an embeddable unit and have the updates propagate to the client without having to change the HTML tags used on the serving website.

In one embodiment of the invention, there are four distinct parties involved in performing live updates.
1. The client is a web browser, typically operated by a user. The client can be running on a desktop, a laptop, a tablet, a mobile device, or any other platform.
2. The embed site is any website that contains a page with the unit provider's embed code in it.
3. The Content Delivery Network (CDN) is a typical third-party content delivery network that serves static content. The CDN can request new content from a dynamic server, but updating the existing content on a CDN is a slow process because any piece of content store on the CDN may be replicated and distributed over multiple locations.
4. The unit provider is the entity providing the embeddable unit, and the embed tag that goes along with it. When a unit is updated, the updates are stored on the provider's backend servers. The provider has a set of dynamic servers that are able to retrieve cached information, as well as build dynamic responses to information requests by accessing the backend servers.

Embodiments of the present invention use the process described herein to perform live updates on embeddable units such as display ads and widgets, however, the invention is not limited to these examples of embeddable units. The live update according to the present invention satisfies the following aspects.
1. High scale and low cost,
2. Fast, reliable, and low cost, and
3. Fast, reliable, and high scale With reference to high scale and low cost, one could have the client load the embeddable unit from the CDN, and keep the content on the CDN up to date by flushing it every time the embeddable unit changes on the provider's side. This solution is low cost by virtue of using a CDN; it is high scale because once the CDN is flushed, embeddable units everywhere will see the update. However, this solution would not be fast—typically, it takes up to 20 minutes to flush the CDN and propagate the changes, so the updates would not appear right away. During that time, the information served by the CDN will be unreliable.

With reference to fast, reliable, and low cost, one could issue a new embed tag every time that the unit is updated on the server. The embed tags can then be manually replaced on each web page containing the old tags. While this low cost and reliable solution works well when your embeddable unit is only on a couple of different pages, it becomes untenable at high scale.

With reference to fast, reliable, and high scale, when cost is not an object, the solution is easy—just throw more servers at the problem. One example of a high cost solution would be to always go to the source for your embeddable unit. Every time an embeddable unit is loaded on a web page, the client can load it directly from the provider, with no caching involved. This is certainly reliable, and if you have the money for a lot of servers and bandwidth, this can be done at high scale for embeddable units served at many locations. But of course this is very expensive.

The trick, then, lies in accomplishing all three goals at once—scalability, low cost, and fast, reliable changes, which is addressed and provided by the present invention.

Live Update—Summary

In an exemplary embodiment a process manages to perform live updates for embeddable units in a way that is fast, reliable, scalable, and cost-effective by using a clever combination of dynamic server lookups, caching, and CDN use. The live update process is tightly integrated with the process by which the client obtains the embeddable unit, so we will focus on that entire process here. FIG. 1 in conjunction with the outline below describes how this works at a high level.

1. When the client loads a web page with an embed tag, it uses an embeddable unit ID in the tag to request some additional information about the unit from the provider, which will determine whether it has been updated.
2. The provider's dynamic server obtains this information via a lightweight cache lookup, and returns a key to the client.
3. The client uses the key obtained from the provider to request the embeddable unit from the CDN. If the CDN finds a match for the key, we skip to step 6; otherwise, we perform steps 4 and 5.
4. If no match is found, the CDN goes back to the provider to request all the data for the embeddable unit.
5. The provider performs some expensive lookups, and returns this data to the CDN.
6. The CDN serves the embeddable unit to the client.

Steps 4 and 5 are expensive, but they are only performed when the CDN is unable to find a match for the embeddable unit being sought—i.e. either the first time a unit has ever been requested, or the first time it is requested after an update. Both of these events are relatively rare, so the vast majority of the time these two high cost steps are avoided. When the CDN finds a match, the sequence of steps is 1-2-3-6. If it does not, then all 6 steps are performed in order. Let us go into a little more detail about how this is accomplished.

Preliminaries

In order for the live update process to work, there are some conventions that must be followed by the unit provider in handling embeddable units and updates. These are discussed here.

IDs and Versions

The unit provider must keep track of IDs and versions for each embeddable unit. Each unit must have a unique identifier, as well as multiple IDs corresponding to different components of the unit. In an exemplary implementation, each embeddable unit could have two key components—the registration (the core embeddable unit) and the instance (a set of customizations applied to the unit by a user). However, a different set of components may be appropriate for other uses. The important thing is that each component must have:

An ID that will uniquely identify that particular component. In one example one could use a 32-bit Global Unique Identifier (GUID), but other types of identifiers may also be used.

A version number that is changed each time the component is updated.

As long as the unit provider keeps track of these items, the embedding, updating, and caching actions can be performed as detailed below.

Embedding

The embeddable unit is inserted into a web page using an embed tag. This is usually an HTML <script> tag or <iframe> tag. The embed tag must contain two key components:

The embeddable unit's ID, as described above; and

A URL to some static runtime code located on the CDN, which will be used by the client to bootstrap the embeddable unit loading process.

Updating and Caching

The ID and version number for every component of every embeddable unit must be stored in the cache.

This means that when a new unit is published, the provider must place the embeddable unit's ID, as well as the types, IDs and version numbers of all components of that unit into the cache. When the embeddable unit is updated, the version numbers associated with each component ID must be updated and placed in the cache.

This makes sure the cache always has up-to-date version numbers for all components. This is a key requirement of the live update process.

Live Update

Figure 2:
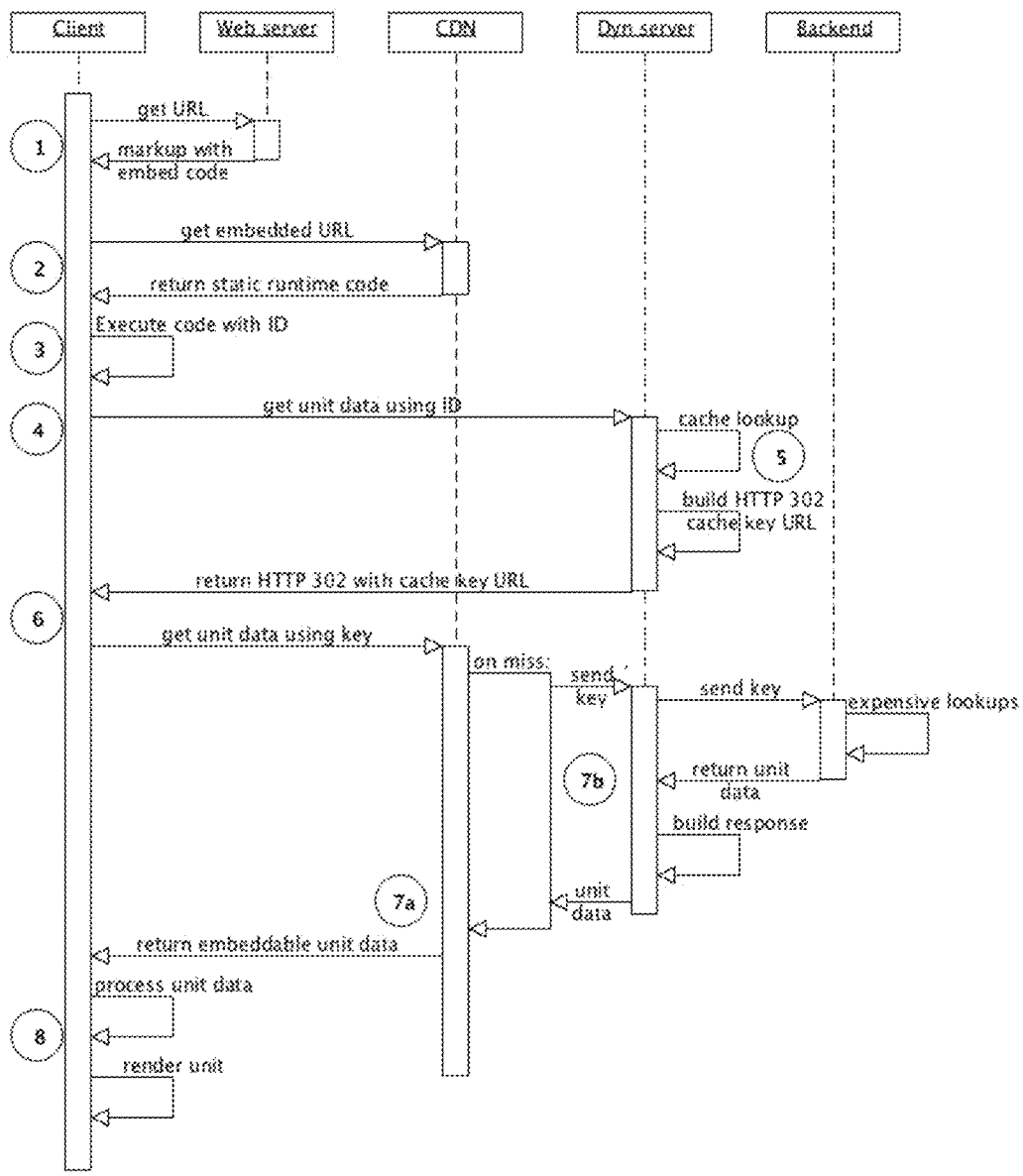
FIG. 2 shows details of a live update method and system according to an exemplary embodiment of the invention.

The process by which the embeddable unit is obtained and displayed to the user is illustrated in FIG. 2. The successful execution of this process relies on the preliminaries described infra.

1. The client loads a page with the embed code for the embeddable unit.
2. The client gets the URL specified in the embed code. This URL contains some static runtime code that is stored on the CDN.
3. The runtime code (e.g. JavaScript in one embodiment) executes with the unit ID from the embed code, dynamically loading some necessary libraries and bootstrapping the embeddable unit load process.
4. The client passes the embeddable unit's ID to the provider's dynamic server and requests additional information about that unit.
5. The dynamic server does a cache lookup, converting the ID into a multipart cache key URL. This URL points to a location on the CDN, and encodes a cache key that contains all the type, ID, and version number of each component associated with the embeddable unit of the given ID. For instance, if your embeddable unit contains a registration and an instance as its two components, the cache key may look like this:

r/01234567-89ab-cdef-0123-456789abcdef/103/i/fed-cba98-7654-3210-fedc-ba9 876543210/14.

The dynamic server then returns an HTTP 302 redirect message containing the cache key URL to the client.

6. The client loads the cache key URL, which targets the CDN and makes a request for the embeddable unit with the specified cache key.
7. The CDN receives the request, and does one of two things:
    a. If the embeddable unit corresponding to the cache key is found, the CDN will serve that unit's data to the client.
    b. If the embeddable unit is not found, that means this is either a new unit, or an old unit that has been updated, so the version numbers stored on the CDN no longer correspond to the unit's latest version. Thus, the CDN needs to load the embeddable unit from the provider's servers. This is accomplished as follows:
        i. The CDN sends the cache key that it was unable to match to the provider's dynamic server.
        ii. The dynamic server contacts the provider's backend servers, performing a series of potentially expensive lookups to find the embeddable unit that matches the cache key.

iii. The dynamic server builds the response and passes it to the CDN.
iv. The dynamic server sends the embeddable unit that matches the key to the CDN.
v. The CDN receives this data, saves it along with its associated cache key, and sends it to the client.
8. The client receives the data, generates the HTML, and displays the updated embeddable unit.

What is claimed is:

1. A method for transmission of live updates on a web page in a browser on a client device, comprising:
   (a) said client device loading a web page, wherein said web page contains an embed code for an embeddable unit of a live update on said web page;
   (b) obtaining from a content delivery network an embedded URL specified in said embed code, wherein said URL contains executable static runtime code using a unit ID;
   (c) passing said unit ID to a dynamic server which performs a lookup to convert said unit ID into a cache key URL, whereby said cache key URL points to a location on said content delivery network and encodes a cache key containing information for said embeddable unit of said live update on said web page;
   (d) said dynamic server using an HTTP redirect delivering to said client device said cache key URL, wherein said cache key URL is loaded by said client device which then targets said content delivery network to make a request for said embeddable unit of said live update with said cache key URL; and
   (e) said content delivery network serving said embeddable unit of said live update to said client device on which said live update is displayed or updated, wherein said embed code is capable of updating said live update and have said updates propagate to said client device without having to change any aspect on said content delivery network.

2. A system for transmission of live updates on a web page in a browser on a client device, comprising:
   (a) said client device loading a web page, wherein said web page contains an embed code for an embeddable unit of a live update on said web page;
   (b) a content delivery network providing to said client device an embedded URL specified in said embed code, wherein said URL contains executable static runtime code using a unit ID;
   (c) a dynamic server performing a lookup to convert said unit ID into a cache key URL, whereby said cache key URL points to a location on said content delivery network and encodes a cache key containing information for said embeddable unit of said live update on said web page;
   (d) said dynamic server using an HTTP redirect delivering to said client device said cache key URL, wherein said cache key URL is loaded by said client device which then targets said content delivery network to make a request for said embeddable unit of said live update with said cache key URL; and
   (e) said content delivery network serving said embeddable unit of said live update to said client device on which said live update is displayed or updated, wherein said embed code is capable of updating said live update and have said updates propagate to said client device without having to change any aspect on said content delivery network.

* * * * *